United States Patent [19]

Buchwald et al.

[11] 4,230,467
[45] Oct. 28, 1980

[54] APPARATUS FOR REMOVING FOAM

[75] Inventors: Hubert W. Buchwald, Birmingham, Ala.; Peter C. Houle, Richmond, Va.

[73] Assignee: TII Corporation, Lindenhurst, N.Y.

[21] Appl. No.: 943,304

[22] Filed: Sep. 18, 1978

[51] Int. Cl.² .............................................. B01D 19/02
[52] U.S. Cl. ................................. 55/178; 55/DIG. 25
[58] Field of Search ..................... 55/36, 41, 87, 159, 55/178, DIG. 25; 210/44, DIG. 5

[56] References Cited

U.S. PATENT DOCUMENTS

| | | | |
|---|---|---|---|
| 3,231,251 | 1/1966 | Scherbel | 55/178 X |
| 3,425,899 | 2/1969 | Nilsson | 55/178 X |
| 3,545,937 | 12/1970 | Rozhold et al. | 55/178 X |
| 3,775,339 | 11/1973 | Kasulin et al. | 55/178 X |
| 3,873,283 | 3/1975 | Hamblin | 55/178 X |

FOREIGN PATENT DOCUMENTS 1091199  11/1967  United Kingdom ................. 55/178 X Primary Examiner—Charles N. Hart
Assistant Examiner—Richard W. Burks
Attorney, Agent, or Firm—Oldham, Oldham, Hudak & Weber Co.

[57] ABSTRACT

A foam removal apparatus for a vessel which contains a liquid as well as foam bubbles has a cover inclined with respect to the horizontal, a screen, and a trough, the trough being located beneath at least a portion of the screen for removing foam pushed through said screen. The apparatus can be used in conjunction with any shaped vessel and requires no energy for foam removal. Either a rising liquid level in the vessel or a continuous generation of foam forces the foam against the inclined cover and through the screen which causes a substantial amount of foam bubbles to collapse and fall as liquid into the trough.

16 Claims, 4 Drawing Figures

APPARATUS FOR REMOVING FOAM

BACKGROUND OF THE INVENTION

The present invention relates to an apparatus for foam removal. More specifically, the present invention relates to an apparatus which requires no outside source of energy for removing excess foam in any type of vessel by forcing it through a screen, causing it to collapse and hence revert to a liquid, and carrying it off in a trough.

Heretofore, numerous devices have been employed in foam removal. Generally, they relate to abating surface tension such as through the utilization of an electrical charge, overflow weirs, skimming devices which mechanically remove foam, use of pumps which suck in the foam and discharge it usually in the form of a liquid, and chemical treatment compounds. However, all of these various conventional methods, matters and techniques, as well as others not listed, generally involve the use of some outside source of energy.

An exception is the apparatus of U.S. Pat. No. 1,893,411, granted Jan. 3, 1933. This patent relates to the removal of foam or the "head" obtained in the fermentation of liquor utilizing a floating plate having apertures therein. As the foam passes through the apertures, some of it will collapse and return to the tank. In another embodiment of the invention, truncated cones extend upwardly out of the plate with other parts of the plate containing small apertures. The foam passes through the cones and accumulates on the plate until it is naturally broken down over a period of time and returns as liquid to the tank through the small plate apertures. Generally, this apparatus is incapable of handling moderate or large amounts of generated foam and does not provide for foam removal, but rather returns it to the tank.

A prior art patent which relates to the utilization of a pump for foam removal is U.S. Pat. No. 3,169,841, granted Feb. 16, 1975. Basically, the apparatus is merely a suction pump having flexible veins therein which are driven by an offset shaft in a cylindrical chamber. The pump, through a vacuum, sucks foam into a chamber and the chamber is reduced in volume, thereby exerting pressure on the foam and causing it to collapse and form a liquid which is discharged.

In U.S. Pat. No. 3,722,184 granted Mar. 27, 1973, a liquid foam mixture is pumped through a series of baffles or foam-breaking pads which causes the bubbles to collapse or become increasingly smaller. Here, again, the foam is not removed, but rather remains within the same vessel. Additionally, large amounts of foam cannot be readily handled.

SUMMARY OF THE INVENTION

It is therefore an object of the present invention to provide a foam removal apparatus which requires no outside source of energy for a vessel.

It is another object of the present invention to provide a foam removal apparatus, as above, wherein the foam is substantially collapsed and transported away from the vessel.

It is a further object of the present invention to provide a foam removal apparatus, as above, which includes a cover, the cover being inclined with respect to the horizontal.

It is a still further object of the present invention to provide a foam removal apparatus, as above, wherein a screen and a trough are provided, said trough being located beneath at least a portion of said screen for removing liquid and foam passing through the screen.

It is a yet further object of the present invention to provide a foam removal apparatus, as above, wherein either a rising liquid level or a continuous generation of foam forces said foam against the inclined cover and through the screen which causes a substantial amount of said foam bubbles to collapse and fall as liquid into the trough.

It is a yet further object of the present invention to provide a foam removal apparatus, as above, wherein the trough is located externally of said tank or internally within said tank.

It is a yet further object of the present invention to provide a foam removal apparatus, as above, wherein said cover extends beyond the side walls of said vessel.

It is yet a further object of the present invention to provide a foam removal apparatus, as above, wherein a plurality of screens exists.

It is a yet further object of the present invention to provide a foam removal apparatus, as above, wherein said screens contain a chemical coating to assist in the breakdown of the foam bubbles.

It is yet a further object of the present invention to provide a foam removal apparatus, as above, wherein said screen chemical coating is selected from the class consisting of a silicon-based material, a nonionic silicon-based, water dispersible antifoam, an emulsified silicon antifoam and various polysiloxanes, including methyl polysiloxane and dimethyl polysiloxane.

These and other objects of the present invention will become apparent from the following specification which describes in detail various embodiments without attempting to discuss all of the modifications in which the invention might be embodied; the invention being measured by the appended claims and not by the details of the specification.

In general, a foam removal apparatus for a vessel containing liquid and foam bubbles, comprises: a cover for the vessel, said cover inclined with respect to the horizontal; a screen; and a trough, said trough located beneath at least a portion of said screen for removing foam passing through said screen.

DESCRIPTION OF THE PREFERRED EMBODIMENTS

The concepts of the present invention relate to an apparatus for foam removal from a vessel containing a liquid and a foam. The foam is substantially collapsed and transported away from the vessel. The apparatus can be generally utilized with any vessel, mixing tank, cistern, receptacle and the like, as well as in association with, generally, any type of process. Specific preferred uses for the apparatus include treatment systems of sewage, waste water and potable water. The removal of the foam from the various systems generally increases the efficiency of the processes. In other systems wherein the foam may have some commercial value, the removed foam may be further treated to yield desired products.

Figure 1:
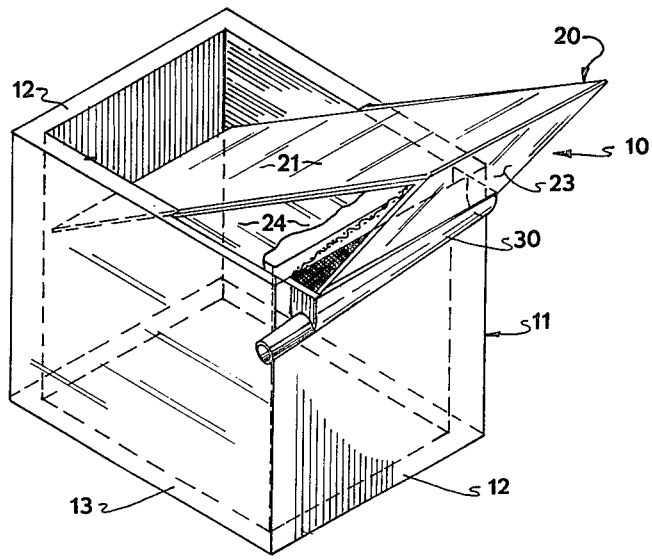
FIG. 1 is a perspective view of the foam removal apparatus located upon a vessel in accordance with the present invention.

The foam removal apparatus is generally indicated by the numeral 10 and is situated upon a vessel, generally indicated by the numeral 11. Vessel 11 may be constructed of any and various materials, including concrete, metals such as steel and copper, wood, and the like. As shown in FIG. 1, vessel 11 is rectangular, however, it may generally have any size and shape such as a sphere, a cylinder, a truncated frustum, an ellipsoidal and the like.

The foam removal apparatus contains a cover, generally indicated by the numeral 20, which generally and preferably has a shape corresponding to that of the top opening of vessel 11. In the embodiments shown in FIGS. 1 and 3, the vessel has end walls 12 and side walls 13. In this particular embodiment, cover 20 has a top 21, an end wall 23, which is inclined or extends downwardly to a trough 30, and side support walls 24. Although cover 20 may be made from various pieces attached together, preferably, it is integral as shown in FIG. 1 and rests upon vessel side walls 13 through the bottom of cover side walls 14. Additional support is obtained from cover end wall 23 resting upon trough 30.

As shown, top cover 21 generally is inclined with respect to the horizontal and the lower end, that is, end 21A which extends into the vessel is located juxtaposition to vessel end wall 12. Desirably, a sufficient distance, indicated by the letter "d" in FIG. 2, serves the purpose of permitting the liquid level to rise without lifting cover 20.

Figure 2:
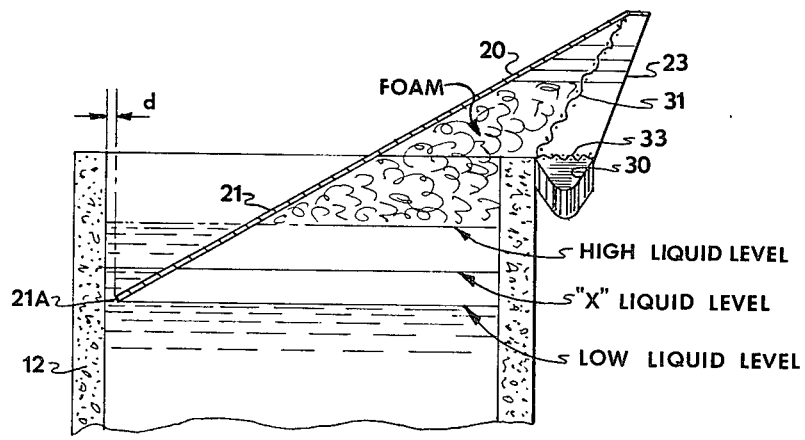
FIG. 2 is a cross-sectional elevation of the foam removal apparatus and vessel showing the screens and the trough.

The cover may be made out of any material and may be of the same material as the vessel. Desirably, however, the cover is made of a lightweight material such as plastic, wood, and the like. Cover 20, as noted, is inclined with respect to the horizontal so that the foam generated is forced along the cover towards trough 30. The trough or a portion thereof is located beneath screen 31 which serves to collapse the foam. According to the present invention, location of the trough may be external with respect to the vessel, for example as shown in FIG. 2, or internal, for example, as shown in the embodiment depicted in FIG. 4. The cover support wall, as noted, is desirably outwardly inclined with respect to the vessel so that a greater screen surface area is exposed.

Figure 3:
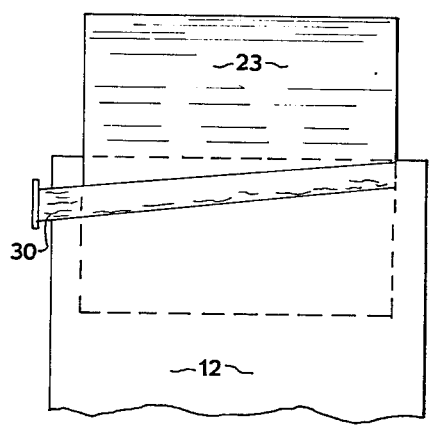
FIG. 3 is an end-view elevation of the foam removal apparatus and vessel showing the inclination of the trough.

In the embodiments depicted in FIGS. 1 through 3, cover 20 is an integral structure. However, if made from individual pieces, they can be secured together by any conventional means as through welding, the use of adhesives, the use of fastening members such as screws or in any other conventional manner.

Figure 4:
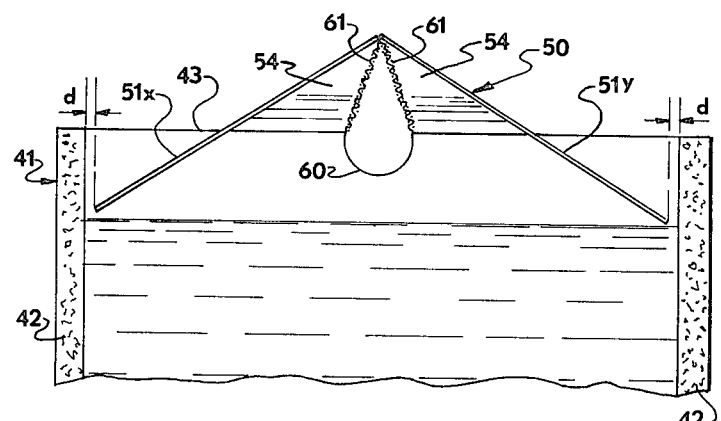
FIG. 4 is a cross-sectional elevation of another embodiment of the invention.

In the embodiment shown in FIG. 4, trough 60 is located approximately in the center of vessel 41 and, thus, the cover, generally indicated by the number 50, has two inclined portions 51x and 51y extending towards vessel end walls 42. Generally, the cover may be constructed of the same materials and in the same manner as set forth above and thus will have a clearance "d" located on each cover and juxtaposition to vessel end walls 42. As before, screen 61 or a portion thereof is located above trough 60 and in this embodiment, two screens may be utilized for foam forced up along each inclined cover portion 51x and 51y. Cover side support walls 54 preferably exist on the top of vessel side walls 43 and are generally in the shape of a triangle.

The two embodiments shown depict only preferred cover configurations and, of course, many variations and/or different arrangements may be utilized including multiple cover portions, multiple troughs, multiple screens and the like. The important aspect is that the cover of various portions thereof as in FIG. 4, be inclined with respect to the horizontal so that either upon the rising liquid level or the generation of foam, the foam is forced against the incline cover and directed through the screen or screens.

A trough, generally indicated by the numeral 30 in FIG. 1 through 3 and by the numeral 61 in FIG. 4, serves to collect collapsed foam and therefore at least a portion of the trough is located beneath a screen, generally indicated by the numeral 31 in FIGS. 1 through 3 and by the numeral 61 in FIG. 4. For efficient removal, generally the entire trough lies beneath the screen or else a wall, such as support wall 23 in FIG. 1 through 3, exists which directs the collapsed foam into the trough. The trough material is generally not important so long as it is not corroded, degraded or otherwise destroyed by the collapsed foam or liquid collected and, hence, may be made out of any material such as concrete, metal and the like. As shown in FIG. 3, trough 60 is generally inclined and connected to a pipe so that the collected foam and liquid is removed from the vessel and may be transferred to a recovery plant when the liquid or foam has commercial value. Moreover, in some instances, it may be desired that the foam and liquid received by trough 30 may be conveniently supported on the vessel through any conventional connection.

Screen 31 or 61 which serve to collapse the foam bubbles is desirably located between and may be connected to, respectively, either top cover 21 or 51 and especially to trough 30 or 60, in an area which is at least above a portion of the trough. The screen may be a metal screen, a plastic screen, a fiberglass screen, or otherwise fashioned so that it substantially contains apertures therein. The size of the apertures will generally vary according to the foam bubble size encountered in a particular liquid foam system and preferably are smaller than the average bubble size. Normally, the force generating the foam, e.g., an inlet flow pipe, will be sufficient to force the foam through the screen whereby the surface is reduced so that some of the bubbles collapse. Another force which forces the foam through the screen is a rising liquid level such as a low liquid level in FIG. 2 which rises to an intermediate "X" or a high liquid level. However, as known to one skilled in the art, some of the foam bubbles will pass through the screen unaffected or be of reduced size and, hence, result in some foam being transmitted to the trough.

A plurality of screens may be utilized to retard this result with a successive screen having a smaller aperture size. As shown in the embodiment of FIG. 2, a first, initial, or primary screen 31 exists between the trough 30 and cover 21 with a second, succeeding, or secondary screen 33 having a slightly smaller aperture size existing across the top of the trough. Of course, additional screens could be utilized along with varied locations. Generally, it has been found that an excessive number of screens is not desirable in that they tend to create a "blockade" effect and tend to prevent some liquid or "passed through foam" from reaching the trough.

In addition to screen 31 or screen 61, it is desirable and an important aspect of the present invention to utilize a coating on said screens which facilitate in the reduction of foam bubbles. Generally, the coating is a silicon-based material. Examples of specific silicon-based compounds include a nonionic silicon-based, water dispersable antifoam such as that manufactured by Emkay Chemical Company under the tradename SD, and silicone antifoam, such as that manufactured by Crucible Chemical Company under the tradename Compound 875, and various polysiloxanes. Examples of specific polysiloxanes include dimethyl polysiloxane, as manufactured by the General Electric Silicone Division and sold under the tradename AF-10, that is, a 10 percent silicone solids dimethyl polysiloxane fluid in oil and water emulsion; methyl polysiloxane, for example, as manufactured by Hodag Chemical Company under the tradename Silicones F-1 and FD series; and, preferably, a dimethyl polysiloxane, as manufactured by Dow Corning under the tradename Dow Corning 200 Fluid.

In accordance with the present invention, the foam removal apparatus was utilized in association with a vessel in the treatment of sewage. As obvious from the examples and data, a substantial amount of foam was removed.

EXAMPLE 1

A sewage treatment plant having an effluent holding tank was utilized, wherein periodically added was a treated sewage effluent. The effluent produced an amount of foam such that it overflowed the tank. A cover was assembled for the tank as shown in FIG. 1 and had a primary screen 31 and a secondary screen 33. Although the amount of foam reduced or collapsed through the screens was fair, trough 30 still carried away a fair amount of foam. The screens were then coated as by painting with Dow Corning 200 Fluid (dimethyl polysiloxane). The coated screens substantially reduced or collapsed the foam such that the matter in trough 30 was virtually all liquid.

Thus, it can be seen that the apparatus of the present invention as well as the coated screens, showed a great improvement in converting the foam to a liquid.

While in accordance with the patent statutes, the preferred embodiments have been described in detail, the invention is to be measured by the attached claims.

What is claimed is:

1. A foam removal apparatus for a vessel containing liquid and foam bubbles, comprising:
   a cover for the vessel, said cover inclined with respect to the horizontal and partially extending downwardly into said vessel;
   said cover having an end wall;
   said cover having side support walls, said side support walls residing upon said vessel; a screen having apertures; and
   a trough, said trough located beneath at least a portion of said screen for removing foam passing through said screen.

2. A foam removal apparatus according to claim 1, wherein said vessel has a first and a second end, said cover having a first end portion and a second end portion, said first end portion residing within said vessel and located juxtaposition to said first vessel end wall so that a sufficient distance exists between said first vessel end wall and said first cover end portion to permit the liquid in said vessel to rise therebetween.

3. A foam removal apparatus according to claim 2, wherein said cover end wall and said second cover end portion forming a junction, said screen extending between said junction and said second vessel end wall.

4. A foam removal apparatus according to claim 1, wherein said cover end wall extends between said cover and said trough, and including a second screen having apertures, said second screen located over said trough.

5. A foam removal apparatus according to claim 1, including a plurality of incline cover portions.

6. A foam removal apparatus according to claim 5, wherein said incline covers have an upper end portion, and include a plurality of screens, said screens extending from said upper inclined end portion to said trough.

7. A foam removal apparatus according to claim 6, including a screen extending over said trough.

8. A foam removal apparatus according to claim 5 or 6, wherein said covers partially extending down into said vessel have an end portion, said cover end portion residing within said vessel and located juxtaposition to a vessel end wall so that a sufficient distance exists between said vessel end wall and said cover end portion to permit the liquid in said vessel to rise therebetween.

9. A foam removal apparatus according to claim 2, wherein said trough is located beneath said screen.

10. A foam removal apparatus according to claim 1, including a second screen, said second screen located across said trough.

11. A foam removal apparatus according to claim 2, including a plurality of screens.

12. A foam removal apparatus according to claim 11, including a plurality of troughs.

13. A foam removal apparatus according to claim 2, wherein said trough is located externally of the vessel.

14. A foam removal apparatus according to claim 2, wherein said trough is located internally of the vessel.

15. A foam removal apparatus according to claim 2, wherein said screen is coated with a material to reduce the foam.

16. A foam removal apparatus according to claim 15, wherein said material coated on said screen is selected from the class consisting of methyl polysiloxane and dimethyl polysiloxane.

* * * * *